United States Patent [19]

Froeschke

[11] Patent Number: 5,013,498
[45] Date of Patent: May 7, 1991

[54] METHOD AND APPARATUS FOR PRODUCING PASTILLES

[75] Inventor: Reinhard Froeschke, Weinstadt, Fed. Rep. of Germany

[73] Assignee: Santrade Ltd., Luzern, Switzerland

[21] Appl. No.: 457,805

[22] PCT Filed: Apr. 6, 1989

[86] PCT No.: PCT/EP89/00369
§ 371 Date: Dec. 26, 1989
§ 102(e) Date: Dec. 26, 1989

[87] PCT Pub. No.: WO89/10187
PCT Pub. Date: Nov. 2, 1989

[30] Foreign Application Priority Data

Apr. 23, 1988 [DE] Fed. Rep. of Germany ....... 3813756

[51] Int. Cl.$^5$ ............... B29B 9/00; B29C 67/02
[52] U.S. Cl. .......................... 264/8; 264/164; 264/37; 425/6; 425/217; 425/377; 425/382.3; 425/DIG. 13; 425/378.1
[58] Field of Search ............... 425/6, 377, 382.3, 217, 425/378.1, DIG. 13; 264/5, 13, 8, 297.1, 299, 164, 37

[56] References Cited

U.S. PATENT DOCUMENTS

| | | | |
|---|---|---|---|
| 2,123,992 | 7/1938 | Formhals | 425/6 |
| 3,017,668 | 1/1962 | Sundman | 264/13 |
| 3,287,472 | 11/1966 | Wolf et al. | 264/5 |
| 4,279,579 | 7/1981 | Froeschke | 264/13 |
| 4,559,000 | 12/1985 | Froeschke | 425/6 |
| 4,578,021 | 3/1986 | Schermutzki | 425/6 |
| 4,610,615 | 9/1986 | Froeschke | 264/13 |
| 4,623,307 | 11/1986 | Froeschke | 425/382.3 |
| 4,795,604 | 1/1989 | Matsuzaki et al. | 264/13 |

FOREIGN PATENT DOCUMENTS 3530508 3/1987 Fed. Rep. of Germany .
60-261537 12/1985 Japan ...................... 425/6

Primary Examiner—Jeffery Thurlow
Assistant Examiner—Mathieu Vargot
Attorney, Agent, or Firm—Burns, Doane, Swecker & Mathis

[57] ABSTRACT

Pastilles are formed by passing small quantities of a viscous material through small openings and onto a moving conveyor surface located therebeneath. The viscous material is contacted by the conveyor surface after the material protrudes from the openings, but before the material becomes sufficiently large to break free and fall. Instead, the conveyor surface forcefully extracts the material from the openings, thereby resulting in the formation of pastilles which are of smaller size than would have been the case had the material been allowed to break free and fall on its own accord.

15 Claims, 3 Drawing Sheets

METHOD AND APPARATUS FOR PRODUCING PASTILLES

BACKGROUND OF THE INVENTION

The present invention relates to a method and apparatus for producing pastilles.

A method and apparatus of this type has been previously known from German Patents No. 28 53 054 and No. 29 41 802 which, in turn, correspond to U.S. Pat. No. 4,279,579. In the case of these known concepts, the viscous mass is guided in tubular bodies which are designed in such a manner that, due to a certain overpressure prevailing inside the rotating tubular bodies, the mass is extruded downwardly in the form of drops every time the holes of the two tubular bodies come into alignment with each other. The drops so formed fall onto a cooling conveyor, where they are flattened a little through their own weight, and solidify thereafter to form the desired, as a rule substantially lentil-shaped, pastilles.

This way of producing pastilles, which is dependant on the formation of drops, requires that the passage openings in the outer rotating tubular body have certain minimum diameters. Consequently, the size of the pastilles that can be produced is limited, at the lower end of the scale.

SUMMARY OF THE INVENTION

It is the object of the present invention to provide a method of the type described above which enables considerably smaller pastilles, so-called micropastilles, to be produced without much more input.

It is proposed to achieve this object of the invention by a method which departs from the production method used heretofore, which was based on the formation of drops. In contrast, the individual drop-like quantities which later solidify to form the micropastilles are produced by bringing the mass, which penetrates through the openings, intermittently into contact with a contact surface which acts to draw the mass particles forcedly out of the openings due to their inherent viscosity while the mass particles collectively constitute a drop in a stable state. Stability as defined in Van Nostrand's Scientific Encyclopedia, 6th Edition, pps. 959-960, is the physical state of a drop which has not exceeded a certain size at which the drop detaches itself and falls of its own accord. The individual mass portions can be metered out by opening and closing corresponding passage openings, or else by a corresponding movement of a conveyor surface which is first moved toward the partial quantities emerging from the corresponding openings, and then moved away from the latter intermittently. The use of the novel method according to the invention, therefore, enables considerably smaller pastilles—so-called micropastilles—to be produced in an economic manner. It is, therefore, also possible to use known rotating tubular bodies for carrying out the method according to the invention. It has been found that the number of nozzles and openings to be arranged in the outer rotary tubular body can be much higher than in the case of the known designs, without the risk of stoppage of the production flow. It has become possible in this manner, in spite of the possibility to produce small pastilles, to keep the output volume of the new apparatus substantially in the same range that could be achieved by the known apparatuses, where drops were formed from the substances to be processed. It is to be assumed that the apparatus according to the invention can be used only if the products belong to a higher viscosity range, for example from 1000 cP onwards. The viscosity is adjusted in the conventional manner, normally by controlling the temperature of the agent to be processed. The rotoformer is provided with corresponding heating means.

Alternatively, however, it is also possible, for carrying out the novel method, to provide containers with outlet openings through which the viscous mass penetrates by gravity and from which the mass is picked up and pulled off by a surface of a conveyor belt or a cooling roll which is moved toward the outlet openings.

Certain advantageous developments of the subject-matter of the invention are a solution to the thread-drawing problem which may be encountered in connection with the apparatus according to the invention, as a result of the method used, when processing certain products. In this case, portions of the substance which stick initially to the circumference of the outer rotary tubular body tend to form threads as the tubular body continues its rotation relative to the likewise moving conveyor belt. The threads so formed are removed from the circumference of the tubular body by the thread winding roll and wound upon the latter. During their passage underneath the thread winding roll, all thread ends are pulled off so that the thread ends fall back and the micropastilles, which are then cooled, solidify to a perfect pastille form, without any projecting thread ends remaining on the conveyor.

Advantageously, the mass of the wound-up threads is kept in a flowable condition and to return it to the circumference of the outer rotating tubular body which in turn transfers the additional, but flowable mass sticking to its outside to an inner area where a negative pressure is created by a gap between the inner stationary tubular body and the outer rotating tubular body.

BRIEF DESCRIPTION OF THE DRAWINGS

The subject-matter of the application is illustrated in the drawing by way of diagrammatic representations of the novel method and certain practical examples of the apparatus for carrying out the method, and will be explained in more detail below.

In the drawing.

DETAILED DESCRIPTION OF PREFERRED EMBODIMENTS OF THE INVENTION

Figure 1:
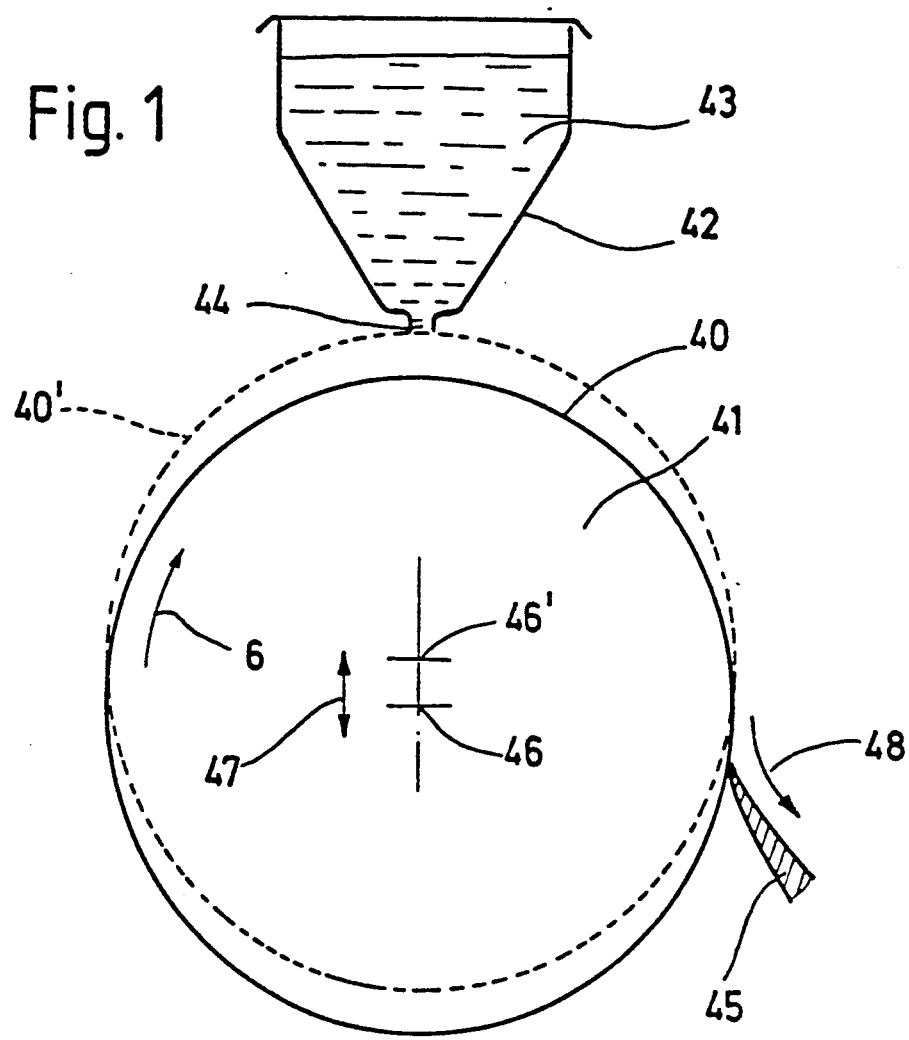
FIG. 1 shows a diagrammatic representation of one possibility of carrying out the method according to the invention for producing pastilles, where a viscous mass flows downwardly through openings and is received by a surface moving past below the openings.

FIG. 1 illustrates diagrammatically a roll (41) rotating about an axis (46) in the direction indicated by arrow (6), which roll (41) can be raised vertically, in the direction indicated by arrows (47), in a manner not shown in detail. The surface (40) of the roll (41) can be moved in this manner into the position indicated by dashed lines (40') in which the surface (40) occupies a position very close to a nozzle-shaped outlet opening (44) of a container (42) filled with a liquid, viscous mass (43). This mass can be kept at a given temperature, in a manner not shown in detail, which temperature ensures that the viscosity of the mass is such that it would flow through the outlet opening (44) slowly and by drops, due to its force of gravity. There is not only one outlet opening (44) above the roll (41) in the area of the vertical plane intersecting the axis (46); in fact there are arranged a plurality of outlet openings disposed in a row extending substantially along a surface line of the roll (41).

As the roll (41) reciprocates in the direction indicated by arrow (47), whereby the axis (46) is raised to the position (46'), the drops, which are in the process of formation but which have not fully penetrated through the opening (44), i.e., the drops being still in a stable state, can be picked up by the surface (40) and entrained in the direction of arrow (6). The roll (41) may be designed as a cooling roll so that the mass particles entrained by and sticking to its surface (40) are permitted to cool and to solidify during the movement of the surface of the roll (41). Finally, they can be removed from this surface, as indicated by arrow (48), by means of a spatula (45).

Figure 2:
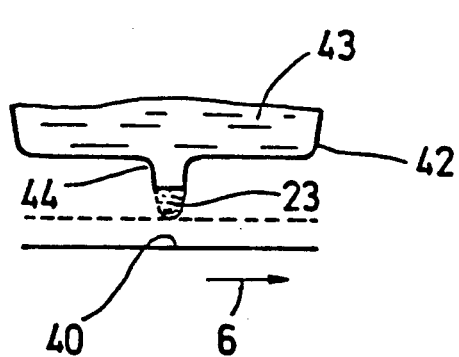
FIG. 2 shows the first step of the beginning formation of drops at the openings, with the subsequent picking-up movement of the surface.
Figure 3:
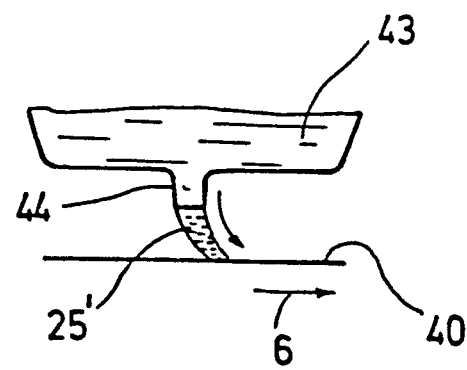
FIG. 3 shows the second procedural step, where the partial mass penetrating through the openings is pulled off laterally from the surface.
Figure 4:
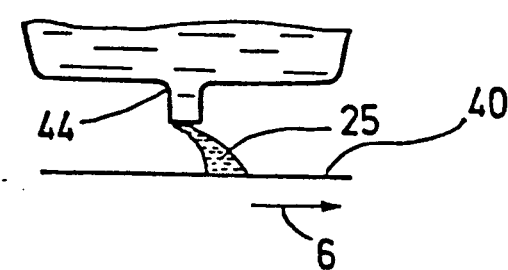
FIG. 4 shows the moment where the partial mass breaks away from the opening.

The procedural steps which are of importance for the novel process and which occur at the moment when the viscous mass (43) leaves the container (42) are illustrated diagrammatically by FIGS. 2 to 4. FIG. 2 shows that the effect of the force of gravity leads to the formation, at the outlet opening (44), of a partial mass (23) resembling the spherical top of a drop. During this procedural step, the surface (40) is still spaced from the spherical top of the partial mass (23), if only a short distance.

FIG. 3 illustrates the condition where the surface (40), which is moving from the left to the right in the direction indicated by arrow (6), has been raised into the position indicated by dotted lines in FIG. 2 so that it gets into contact with the spherical top of the partial mass (23) which in the meantime has moved a little further down. Due to its inherent viscosity, the partial mass comes to adhere to the surface (40) and, as the surface (40) moves on vertically in the direction indicated by arrows (47) and/or to the right in the direction indicated by arrow (6), it is pulled out of the opening until the partial mass which initially appears as an extruded strand (25') forms into a small viscous flowable heap (25) whose connection to the viscous mass, which continues to emerge from the opening (44) above the surface, breaks off, as depicted in FIG. 4. The pointed end projecting from the heap (25) initially sinks back into the heap, due to the remaining flowing properties of the mass, and is formed, under the effect of surface forces, into a substantially lentil-shaped form in which the mass solidifies to form the desired pastille on the surface (40).

This process of pulling the tough mass forcedly out of the opening makes it possible to extract very small quantities so that very small pastilles can be produced with the aid of the novel method.

Figure 5:
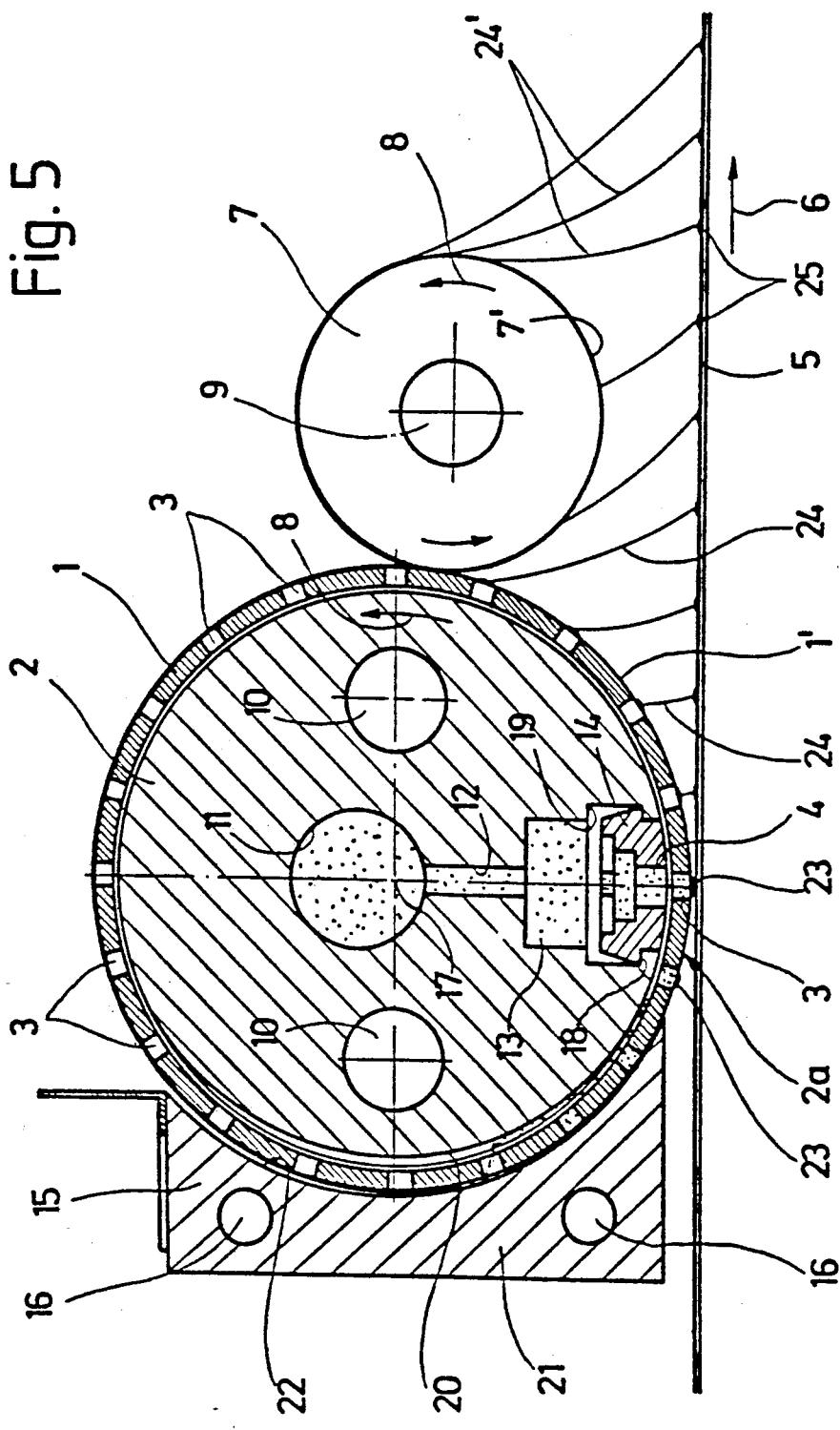
FIG. 5 shows a diagrammatic cross-section through rotating tubular bodies of an apparatus for carrying out economically the method depicted by FIGS. 1 to 4.

FIG. 5 shows an arrangement where an outer tubular body (1) is guided in rotary relationship and concentrically on an inner stationary tubular body (2) which is likewise of cylindrical shape and provided in its interior with one bore (11) serving as a supply bore for the mass to be processed and two bores (10) serving as supply bores for a heat exchanger agent. All the three bores (10 and 11) are provided, in a manner not illustrated in detail, with an outer connection at the end of the inner tubular body (2), while they are closed in the area of the other end, although the bores (10) may of course also be interconnected at this end.

The inner tubular body (2) is equipped with a plurality of bores (12) extending downwardly and vertically to the center axis (17), and opening into a space (13) extending in the longitudinal direction inside the tubular body (2) and ending at the bottom in an enlarged portion which accommodates a nozzle strip (14) provided with lateral guide noses (18) which secure the strip in position. The strip (14) is inserted into its guide (19) from one end of the latter. It comprises a plurality of downwardly directed openings (4) which are brought into alignment cyclically with openings (3) distributed evenly over the circumference of the outer tubular body (1). The outer tubular body (3) rotates about the inner stationary tubular body (2). It is driven in a conventional manner (see German Patent No. 29 41 802) and rotates about the inner tubular body (2) in the direction indicated by arrow (8).

Regarding now the left half of the tubular body (2) it can be noted that its outer wall exhibits, partially, an eccentric design so that the outer tubular body (1) and the inner tubular body (2) form between them an eccentric gap (20) which serves for generating in this area, as a result of the rotation of the tubular body (1), a negative pressure that can be utilized for drawing in, through the openings (3) moving into the area of the gap (20), any material still remaining on the outer circumference (1') of the tubular body (1). This aspect will be described in more detail further below. Opposite the area of the gap (20), there is arranged a heating block (21) comprising two bores (16) serving as channels for a heat exchanger agent or as receiving openings for heating rods. The heating block (21) forms together with the outer circumference (1') of the tubular body (1) a downwardly tapering portion (22) which contributes, in addition to the negative pressure prevailing in the gap (20), towards returning any material that may still adhere to the outer circumference (1') to the inside through the openings (3) before the later reach the surface area (2a) of the inner tubular body (2) where the nozzle strip (4) is arranged.

A steel belt (5) moving from the left to the right in the direction (6) beneath the so-called rotoformer constituted by the tubular bodies (1 and 2) serves as conveyor belt which, in the illustrated embodiment, moves below the rotoformer in a direction perpendicular to the direction of the bores (12) and the position of the openings (4). The steel conveyor (5) is guided past the circumference (1') of the outer rotating tubular body (1) at such a small distance that its surface picks up the mass (23) penetrating through the openings (4 and 3) as they get into alignment with each other. The mass remains stuck to the surface of the conveyor (5) and is pulled out of the openings (3), at least partially, as the conveyor (5) continues to move in the direction of arrow (6) and as the outer tubular body (1) rotates in the direction (8). Once the openings (3) have left the area (2a) they are closed. Any residual quantities of the mass remaining in the openings (3) are entrained upwardly. The rotary speed of the outer tubular body (1) in the direction of arrow (8) and the travelling speed of the conveyor belt (5) in the direction (6) are adjusted to ensure that the volume of the mass pulled through the openings (3) corresponds exactly to the desired quantity. As a rule, the speeds will be adjusted in such a manner that the travelling speed of the conveyor conforms approximately to the circumferential speed of the tubular body (1).

It appears from the above that, contrary to the known method of producing pastilles where the mass is expected to become unstable and drip freely through the openings, the method according to the invention uses a different way of causing the mass to emerge from the openings, whereby the mass is pulled out forcedly so that smaller openings and, as a result thereof, smaller quantities can be provided which, in addition, can be returned partially in upward direction through the openings (3) after the latter have been closed again. The mass remaining on the steel conveyor (5) is extremely small. Consequently, the arrangement according to the invention provides the possibility to produce so-called micropastilles with sizes in the range between 0.5 and 3 mm. It is a requirement for this purpose that the distance between the steel conveyor (5) and the circumference (1') of the outer tubular body (1) must be adjustable in the range between 0.5 and 2 mm, depending on the type of product and its viscosity. The distance between the conveyor (5) and the rotoformer should, therefore, be adjustable within the stated limits, which can be achieved in a simple manner by adjusting the whole rotoformer relative to the frame on which the conveyor is guided.

During the described process of forming micropastilles, which then solidify to their final shape during the further movement of the cooled steel conveyor (5) in the direction (6) at least certain products will give rise, due to their viscosity, to the formation of a thread (24) between the opening (3) and the drop on the conveyor, which thread will become longer as the distance between the circumference (1') of the tubular body (1) and the conveyor (5) increases. In order to prevent these extending threads from breaking off and dropping onto the conveyor (5) in an uncontrolled manner, and forming there undesirable tag-like ends on the pastilles (25), a thread winding roll (7) is provided and arranged to rotate about its axis (26) in the direction of arrow (8), i.e. in the direction of rotation of the outer tubular body (1). The circumference (7') of the thread winding roll (7) is almost in contact with the circumference (1') of the tubular body (1). Consequently, the circumferential surfaces of the tubular body (1) and the thread winding roll (7) rotate in opposite senses in this contact area. The thread winding roll (7), therefore, acts to pick up the threads (24) adhering to the circumference (1') of the tubular body (1) and ensures that the threads will not get longer in the area beneath the thread winding roll (7) and will not break off.

The thread winding roll (7) winds up the thread about the right portion of its circumference (7') where the threads are designated by reference numeral (24') and ensures that the threads are pulled off in upward direction and are prevented, consequently, from dropping off upon the conveyor (5). After the threads (24') have been pulled off, the heat still prevailing in the individual micropastilles (25) is still sufficient to let the breaking point of the thread melt so that the cooling micropastilles assume a rounded shape.

The threads torn off by the thread winding roll (7) are wound up about the latter's upper circumferential area, are then fed by the thread winding roll (7) in the direction indicated by arrow (8) onto the circumference (1') of the tubular body (1), and then transported by the latter to the left, into the area of the intake gap (22) and the gap (20) where the material is returned for re-use.

The different heating means ensure that all these steps are carried out properly and safely. If desired, it is also possible to provide the thread winding roll (7) with a concentric bore (9) for accommodating heating means with a view to keeping the picked-up threads in a sufficiently flowable condition so that they can be returned to the surface (1') of the tubular body (1). However, it may prove absolutely unnecessary in certain cases to heat the thread winding roll (7). As a rule, the heat transmitted to the surface of the rotating tubular body (1) by the tubular body (2) will be sufficient to bring the thin threads that have been wound up into a flowable state.

The outer tubular body (1) is provided with a plurality of the smaller bores (3). For example, 30,000 to 60,000 passage openings (3) may be provided per meter of the length of the outer tubular body (1). This large number enables a high production rate to be achieved. As a rule, the material to be processed into micropastilles should have a viscosity above approx. 1000 cP. This desirable viscosity can be achieved, with very few exceptions, by regulating the temperature of the tubular body (2).

Figure 6:
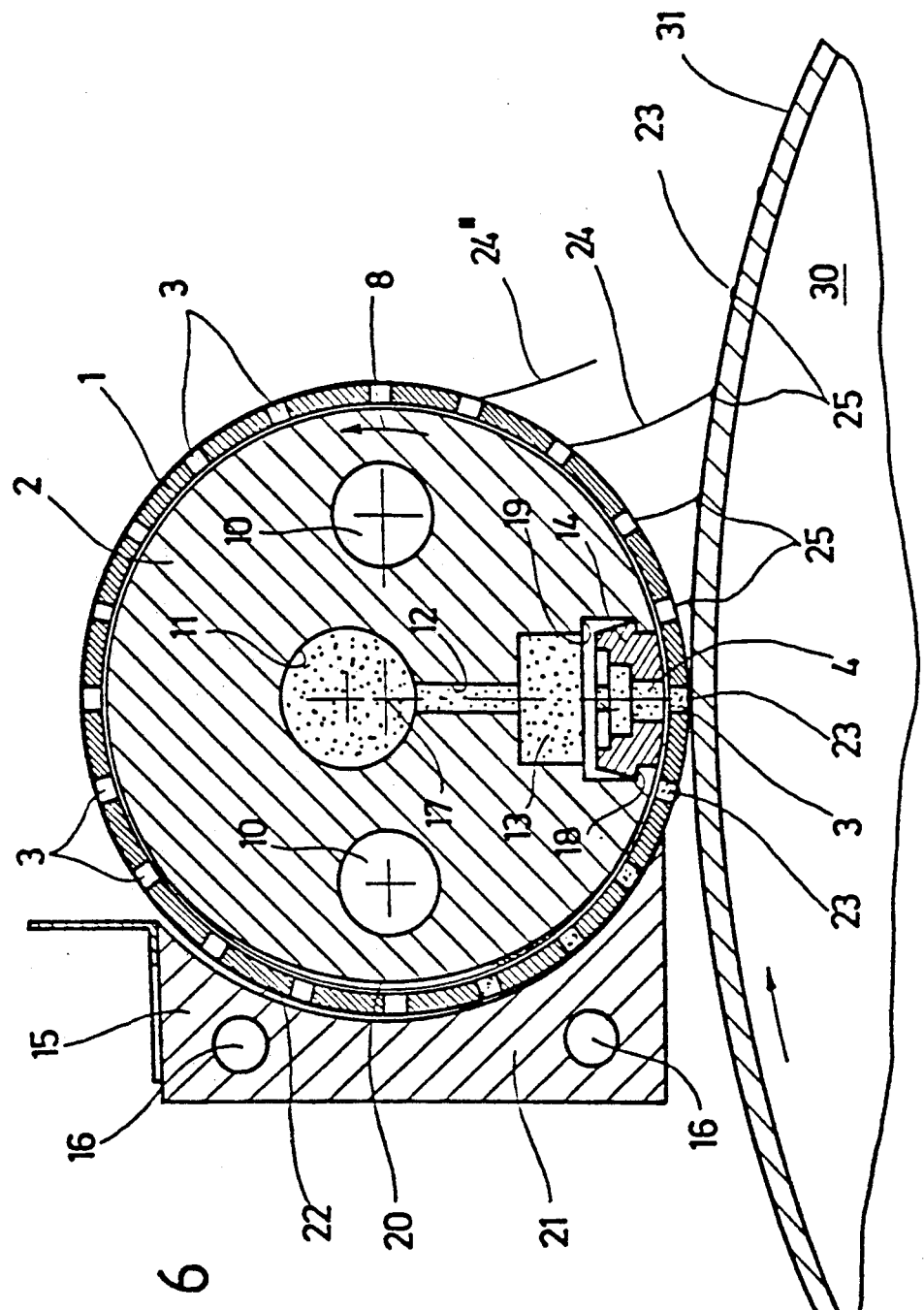
FIG. 6 shows a variant of the apparatus according to FIG. 5.

FIG. 6 shows a variant of the apparatus of FIG. 5 which differs from the latter insofar as the moving cooling conveyor (5) is replaced in this case by a rotating cooling roll (30) whose circumferential surface (31) is moved past the bottom of the tubular body (1) of a so-called rotoformer in the same manner as the conveyor belt (5). The rotoformer is, generally, identical to that shown in FIG. 5 so that the same reference numerals have been used for identical parts.

Just as in the embodiment described in connection with FIGS. 1 to 4, the partial masses (23) formed are picked up by the surface (31) although in this case the latter need not be moved forward and away from the openings (3) as the dosing effect is achieved by the openings (4 and 3) getting intermittently into alignment with each other. Depending on the material being processed, the small heaps (25) forming on the circumferential surface (31) will, in some cases, draw threads (24) which will, however, not drop back to the surface (31) even though no thread winding roll (7) of the type shown in FIG. 5 is provided, as they will be entrained by the tubular body (1) rotating in counter-clockwise direction, until they break off. If this should not be the case for a particular material, then there is always the possibility to equip the embodiment according to FIG. 6 with a thread winding roll (7) of the type shown in FIG. 5. As indicated diagrammatically in FIG. 6, the diameter of the cooling roll (30) is, as a rule, many times greater than the diameter of the tubular body.

I claim:

1. In a method of forming pastilles wherein small quantities of a liquid viscous material are passed through small openings and onto a moving conveyor surface upon which said quantities of material are cooled and solidified, the improvement wherein said liquid viscous material is contacted by said moving conveyor surface after said liquid viscous material protrudes from said openings and while such protruding liquid viscous material is in a stable state, whereby said moving conveyor surface forcefully extracts said quantities of liquid viscous material from said openings.

2. Method according to claim 1, wherein the openings are opened and closed intermittently, and the conveyor surface is moved past the openings continuously.

3. Method according to claim 1, wherein the conveyor surface is moved beneath the openings.

4. Apparatus for producing pastilles from a liquid viscous material comprising:
inner and outer telescopingly and coaxially arranged hollow cylindrical bodies, a first of said bodies having a plurality of first openings distributed over its periphery, a second of said bodies having a plurality of second openings at a lower region thereof, said inner body containing said liquid viscous material,
means for rotating said first body relative to said second body to bring said first openings cyclically into alignment with said second openings, whereupon said liquid viscous material enters said aligned openings and protrudes therefrom, and
a moving conveyor surface arranged beneath said outer body at a distance from said outer periphery thereof, said distance being shorter than a distance in which said protruding liquid viscous material becomes unstable, such that said moving conveyor surface contacts said protruding liquid viscous material while said protruding liquid viscous material is in a stable state and forcefully extracts small quantities of said liquid viscous material from said openings.

5. Apparatus according to claim 4, wherein the conveyor surface is formed by the surface of a conveyor belt which is cooled from below.

6. Apparatus according to claim 4, wherein the conveyor surface is formed by the circumferential surface of a cooling roll which is guided at a small distance from the outer body.

7. Apparatus according to claim 5, wherein the distance between the conveyor surface and the outer periphery of the outer body is adjustable.

8. Apparatus according to claim 4 including a thread winding roll disposed above said conveyor surface at a location downstream of said bodies, an outer periphery of said thread winding roll being closely adjacent said outer periphery of said outer body so that threads of said material extending from said outer periphery to said quantities of material on said conveyor surface are transferred to said thread winding roll.

9. Apparatus according to claim 8 wherein said outer body constitutes said first body which is rotated by said rotating means, said inner body constituting said second body and being kept stationary.

10. Apparatus according to claim 8 including means for rotating said thread winding roll at a higher speed than said outer body.

11. Apparatus according to claim 8 including means for rotating said thread winding roll at the same speed as said outer body.

12. Apparatus according to claim 8 wherein said thread winding roll is provided with heating means.

13. Apparatus according to claim 12 wherein said heating means comprises a channel in said thread winding roll with a heat exchange agent circulating therein.

14. Apparatus according to claim 12, wherein said heating means comprises an electric heater rod.

15. Apparatus according to claim 6 wherein said cooling roll is cooled internally and exhibits a diameter considerably larger than said outer body.

* * * * *